United States Patent [19]

Stoll

[11] 4,166,136

[45] Aug. 28, 1979

[54] LASAGNA NOODLE

[75] Inventor: William F. Stoll, Le Sueur, Minn.

[73] Assignee: Green Giant Company, Chaska, Minn.

[21] Appl. No.: 867,092

[22] Filed: Jan. 5, 1978

[51] Int. Cl.$^2$ .............................................. A23L 1/16
[52] U.S. Cl. .................................. 426/144; 426/557; 426/451
[58] Field of Search ................. 426/557, 451, 144, 138

[56] References Cited

U.S. PATENT DOCUMENTS

| D. 239,215 | 3/1976 | Miller | 426/144 |
|---|---|---|---|
| 1,717,401 | 6/1929 | Perky | 426/144 |
| 2,132,690 | 10/1938 | Hilliard | 426/144 |
| 2,686,720 | 8/1954 | La Rosa | 426/144 |
| 2,769,715 | 11/1956 | Stahmer | 426/144 |
| 3,956,518 | 5/1976 | Goldbach | 426/144 |

Primary Examiner—Jeanette M. Hunter
Attorney, Agent, or Firm—Allegretti, Newitt, Witcoff & McAndrews

[57] ABSTRACT

A lasagna noodle is formed of a substantially straight elongate ribbon of alimentary paste and having a plurality of corrugations extending transversely across the width of the ribbon, the length of the corrugations being less than the total width of the ribbon. The corrugations preferably extend both above and below the planar surfaces of the ribbon and the ends of the corrugations are closed. An elongate planar margin is defined between the elongate edges of the ribbon and the closed ends of the corrugations.

6 Claims, 4 Drawing Figures

U.S. Patent    Aug. 28, 1979    4,166,136
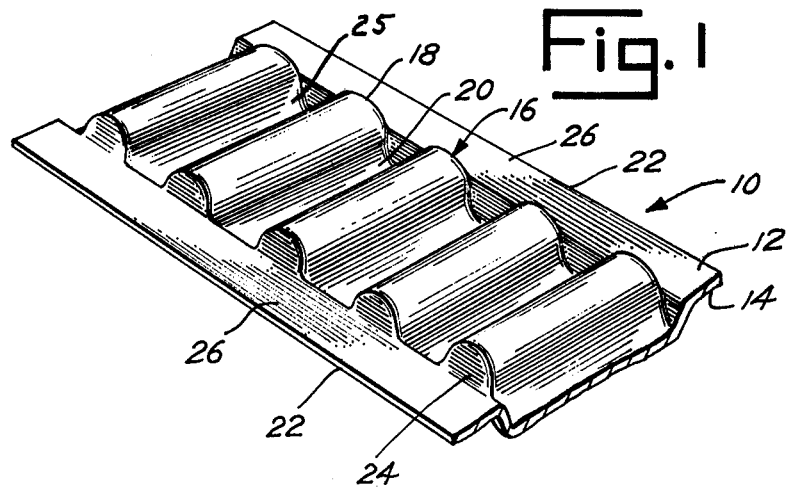
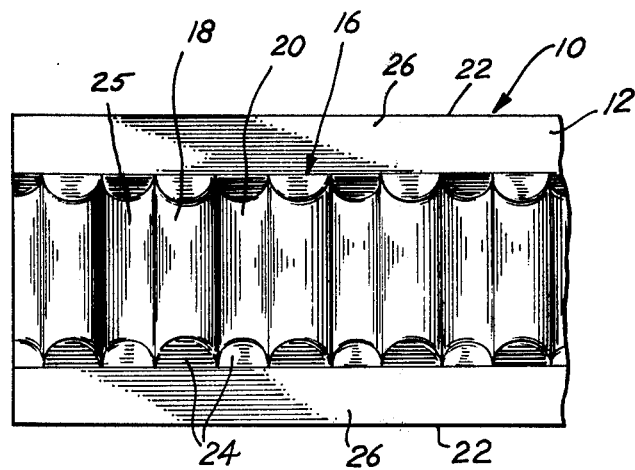
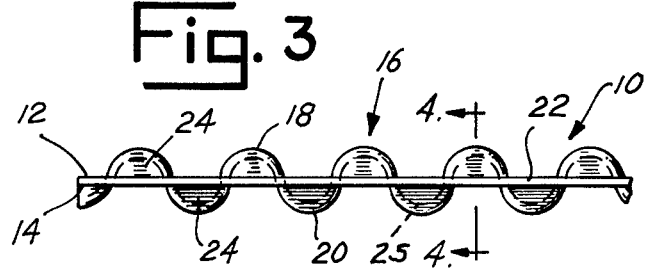
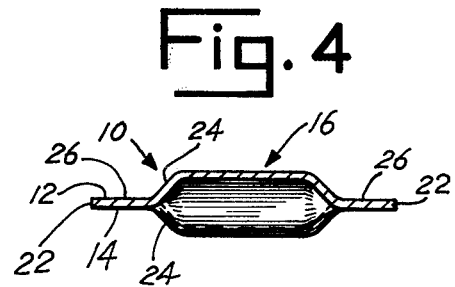

LASAGNA NOODLE

BACKGROUND AND SUMMARY OF THE INVENTION

This invention relates to a shaped alimentary paste product and, more particularly, to an improved lasagna noodle.

Conventional lasagna noodles in the past generally consisted of elongate ribbons of alimentary paste having ripples or flutes formed along the longitudinal edges of the elongate ribbon and having either flat planar centers between the fluted edges, or open ended corrugations or ridges extending longitudinally of the ribbons. By way of example, a conventional lasagna noodle having such fluted edges and longitudinally extending ridges is shown in U.S. Pat. No. 2,686,720.

The present invention is an improvement over such prior lasagna noodles. The lasagna noodle incorporating the principles of the present invention results in better compacting of the noodles with adjacent noodles, both above and below a given noodle, in the finally prepared lasagna. Another advantage of the noodles incorporating the principles of the present invention are that they retain more sauce in their corrugations and, thereby, more readily maintain the integrity of the lasagna during serving. And, the lasagna noodle incorporating the principles of the present invention results in a more uniform distribution of the sauce in the lasagna product than did the prior noodles. Moreover, the proportion of noodle in the finished product may be larger for a given number of noodles when the noodle of the invention is employed than where the same number of prior noodles are employed or, conversely, a fewer number of noodles incorporating the principles of the present invention may be utilized than where the prior noodles are employed to obtain the same proportion of noodles in the finished product. Finally, the lasagna noodle incorporating the principles of the present invention may be formed of ingredients customarily used in the manufacture of pasta and may be formed by using existing equipment, including continuous noodle presses, now used in the industry.

In a principal aspect of the present invention, a shaped alimentary paste product comprises a substantially straight, elongate ribbon of the paste, and a plurality of corrugations formed in the ribbon, the corrugations extending transversely across the width of the ribbon, but having a length less than the total width of the ribbon, at least some of the corrugations being closed at their ends.

In another principal aspect of the present invention, all of the corrugations are closed at their ends and a planar margin is defined between the elongate edges of the ribbon and the closed ends of the corrugations.

These and other objects, features and advantages of the present invention will be more clearly understood through a consideration of the following detailed description.

BRIEF DESCRIPTION OF THE DRAWING

In the course of this description, reference will frequently be made to the attached drawing in which:

FIG. 1 is a partially broken, perspective view of a lasagna noodle incorporating the principles of the present invention;

FIG. 2 is a plan view of the noodle shown in FIG. 1;

FIG. 3 is a side elevation view of the noodle shown in FIGS. 1 and 2; and

FIG. 4 is a cross-sectioned end elevation view of the noodle as viewed along line 4—4 of FIG. 3.

DESCRIPTION OF THE PREFERRED EMBODIMENT

A preferred embodiment of lasagna noodle 10 formed in accordance with the principles of the invention is shown in the drawing.

The lasagna noodle 10 comprises a shaped ribbon formed of a conventional alimentary paste. The ribbon is preferably on the order of about 2″ in width and is substantially longer in length, thereby defining an elongate straight strip of alimentary paste having top and bottom planar surfaces 12 and 14.

A plurality of corrugations, generally 16, are formed along the center of the ribbon. These corrugations comprise a series of adjacent parallel crests 18 and valleys 20, the axes of which are parallel to each other. The corrugations extend transversely across the width of the ribbon as shown in the drawing, but terminate short of the longitudinal elongate edges 22 of the ribbon. The ends of each of the corrugation crests 18 and valleys 20 are closed at 24 at each end so as to define pockets 25 which extend both above and below the planar surfaces 12 and 14. Because the laterally extending corrugations 16 terminate short of the longitudinal edges 22 of the ribbon, a portion of the planar surfaces along the edges of the ribbon remains. These remaining planar portions of the ribbon define a pair of longitudinally extending, elongate margins 26 which extend the length of the noodle between the elongate edges 22 and the corrugation ends 24. Each of the margins 26 preferably lie in the same plane.

The planar elongate margins 26 together with the closed corrugation ends 24 and pockets 25 defined thereby retain the liquid sauce in the corrugations to maintain the integrity of the lasagna during serving. In prior lasagna noodles, a substantial portion of this liquid sauce was lost through the essentially open, fluted edges. Moreover, the transversely corrugated construction of the lasagna noodle of the present invention, together with its planar longitudinal margins, allows better compacting of the noodles with adjacent noodles, both above and below a given noodle, in the finished lasagna. The closed transversely extending corrugations in the lasagna noodle of the present invention also result in a more uniform distribution of sauce constituents in the lasagna. A larger proportion of noodle is possible in the finished lasagna product or, the number of noodles of the present invention, for a given proportion of noodle in finished product, may be reduced over the number of conventional lasagna noodles, because of the larger surface area of the corrugations in the noodle of the present invention.

The noodle of the present invention may be formed of ingredients customarily used in the manufacture of pasta. By way of example, any one of the following mixtures may be used:

EXAMPLE 1

A semolina flour, having 13–15% moisture, together with enough water to raise the mixture to 30–33% moisture.

EXAMPLE 2

A mixture of 95% parts semolina flour, having 13-15% moixture, 5 parts dried egg yolk, and sufficient water to raise the moisture level to 30-33%.

EXAMPLE 3

A mixture of 80 parts semolina flour, having 13-15% moisture, 20 parts whole fresh egg, and sufficient water to raise the moisture level to 30-33%.

EXAMPLE 4

A mixture of 99 parts semolina flour, having a moisture of 13-15%, 1 part acetylated monoglyceride (for example "Myvaplex 600" available from Distillation Products Industries, a division of Eastman Chemical Products, Inc.), and sufficient water to raise the moisture to 30-33%.

The lasagna noodle of the present invention may also be manufactured using equipment presently in use in the manufacture of pasta, including continuous noodle presses. All that need be done is to alter the extrusion dye of the present equipment to produce a drag on the outside marginal edges 26 of the noodle and provide pasta dough to the center portion of the noodle in greater quantities than to the edges. Extrusion rate will control the distance between the corrugations. Given the disclosure of the noodle of the present invention, the extruder design to produce the noodle of the present invention is well within the skill of a person in the extruder art. Accordingly, a detailed description of such conventional dies and equipment for producing the noodle of the present invention is omitted.

It will be understood that the embodiment of the present invention which has been described is merely illustrative of one of the applications of the principles of the invention. Numerous modifications may be made by those skilled in the art without departing from the true spirit and scope of the invention.

What is claimed is:

1. A shaped alimentary paste product comprising a substantially straight elongate ribbon of said paste, said ribbon having a plurality of corrugations formed thereon, said corrugations extending transversely across the width of said ribbon, but having a length less than the total width of said ribbon, at least some of said corrugations being closed at their ends.

2. The shaped alimentary paste product of claim 1, wherein all of said corrugations are closed at their ends.

3. The shaped alimentary paste product of claim 1 wherein said ribbon includes a planar surface on each side thereof, and said corrugations rise above and below said planar surfaces.

4. The shaped alimentary paste product of claim 1 wherein said ribbon includes a planar surface on at least one side thereof, and wherein said corrugations terminate short of at least one of the elongate edges of said ribbon, said planar surface defining a planar elongate margin between said elongate edge and the ends of said corrugations.

5. The shaped alimentary paste product of claim 4 wherein said ribbon includes a planar surface on both sides thereof, and wherein said corrugations terminate short of both elongate edges of said ribbon to define a pair of spaced, but parallel, planar elongate margins along both elongate edges of said ribbon.

6. The shaped alimentary paste product of claim 1 wherein all of said corrugations are closed at their ends, said ribbon having a planar surface on each side thereof, said corrugations rising above and below said planar surfaces, and wherein said corrugations terminate short of both elongate edges of said ribbon to define a pair of spaced, but parallel, planar elongate margins between both elongate edges of said ribbon and the ends of said corrugations.

* * * * *